(12) United States Patent
Sawahata et al.

(10) Patent No.: US 11,505,050 B2
(45) Date of Patent: Nov. 22, 2022

(54) EMERGENCY MECHANISM FOR LID KINEMATIC DEVICE

(71) Applicant: WEBASTO JAPAN CO., LTD., Higashihiroshima (JP)

(72) Inventors: Koji Sawahata, Higashihiroshima (JP); Osamu Yoshida, Higashihiroshima (JP)

(73) Assignee: WEBASTO JAPAN CO., LTD., Higashihiroshima (JP)

( * ) Notice: Subject to any disclaimer, the term of this patent is extended or adjusted under 35 U.S.C. 154(b) by 821 days.

(21) Appl. No.: 16/084,861

(22) PCT Filed: Feb. 27, 2017

(86) PCT No.: PCT/JP2017/007513
§ 371 (c)(1),
(2) Date: Sep. 13, 2018

(87) PCT Pub. No.: WO2017/159323
PCT Pub. Date: Sep. 21, 2017

(65) Prior Publication Data
US 2019/0054810 A1    Feb. 21, 2019

(30) Foreign Application Priority Data

Mar. 18, 2016    (JP) .............................. JP2016-055218

(51) Int. Cl.
*B60J 7/20*     (2006.01)
*E05B 81/90*    (2014.01)
(Continued)

(52) U.S. Cl.
CPC ................. *B60J 7/202* (2013.01); *B60J 7/12* (2013.01); *B60J 7/1204* (2013.01); *E05B 81/90* (2013.01);
(Continued)

(58) Field of Classification Search
CPC .......... E05B 81/16; E05B 81/34; E05B 81/36; E05B 81/90; E05B 79/02; E05B 83/00;
(Continued)

(56) References Cited

U.S. PATENT DOCUMENTS

2011/0113904 A1* 5/2011 Czechtizky ............... F16H 1/16
74/89.23

FOREIGN PATENT DOCUMENTS

DE    10217784 A1 * 11/2003 ............. E05F 15/63
JP    61-252939 A    11/1986
(Continued)

OTHER PUBLICATIONS

Nov. 6, 2003 Machine translation of DE-10217784 (Year: 2003).*
Dec. 13, 2007 Machine translation of JP-2007321346-A (Year: 2007).*

*Primary Examiner* — Christine M Mills
*Assistant Examiner* — Christopher F Callahan
(74) *Attorney, Agent, or Firm* — Maschoff Brennan

(57) ABSTRACT

A linkage for opening and closing a lid through actuation of an electric motor 12 includes a base bracket 21 extending in a longitudinal direction of a vehicle, and a driving lever 14 having one end pivotally connected to the bracket 21 and the other end connected to the lid. The driving lever is driven via a pinion 22 by a sector gear 31 driven by the electric motor. The sector gear is attached to the bracket 21. The electric motor is fixed to a motor bracket 11 and attached via the motor bracket 11 to the bracket. Loosening a member supporting a lateral end portion of the motor bracket 11 and a bolt 41 fixing the bracket 11 to the bracket 21 allows the pinion and the sector gear to be axially disengaged from each other.

5 Claims, 10 Drawing Sheets

(51) Int. Cl.
*E05B 83/00* (2014.01)
*B60J 7/12* (2006.01)
*E05B 81/14* (2014.01)
*E05B 81/16* (2014.01)

(52) U.S. Cl.
CPC .............. *E05B 83/00* (2013.01); *E05B 81/14* (2013.01); *E05B 81/16* (2013.01)

(58) Field of Classification Search
CPC ..... B60J 7/202; B60J 7/1204; Y10T 292/307; Y10T 292/308; Y10T 292/1079; Y10T 292/1082
See application file for complete search history.

(56) References Cited

FOREIGN PATENT DOCUMENTS

| | | |
|---|---|---|
| JP | H06-75826 U | 10/1994 |
| JP | 2007-261398 A | 10/2007 |
| JP | 2007-269089 A | 10/2007 |
| JP | 2007-320334 A | 12/2007 |
| JP | 2007-321346 A | 12/2007 |
| WO | WO-2007114163 A1 * 10/2007 ................ B60J 7/19 |

* cited by examiner

EMERGENCY MECHANISM FOR LID KINEMATIC DEVICE

TECHNICAL FIELD

The present invention relates to an emergency mechanism for a lid kinematic device including a linkage for opening and closing a lid portion (a lid or a deck) covering a storage space for a retractable roof.

BACKGROUND ART

A storage space into which a front roof, a middle roof, and other components forming a retractable roof are retracted in a rear portion of a vehicle is usually covered with a lid. Thus, a series of operations of opening the lid during an opening/closing operation of each roof and closing the lid after the opening/closing operation of the roof need to be performed in accordance with the movement of the roof or any other component.

A lid kinematic device driven by an electric motor may fall into an inoperable state due to a malfunction in a drive train (an electrical system). In particular, if the roof is in an open state, and cannot be closed, a serious problem occurs. In this case, disengaging a pinion driven by the electric motor from a gear driving a linkage and connected to (meshing with) the pinion allows the lid kinematic device to be manually operated unless the linkage itself is abnormal.

CITATION LIST

Patent Documents

[Patent Document 1] Japanese Unexamined Patent Publication No. 2007-261398

[Patent Document 2] Japanese Unexamined Patent Publication No. 2007-321346

SUMMARY OF THE INVENTION

Technical Problem

In a known technique according to Patent Document 1 described above, a pinion is moved away from a gear in the radial direction of the gear. That is to say, the pinion is separated from the gear forward or backward of a lid kinematic device (a lid).

However, this configuration prevents an emergency mechanism from being provided if no space is present in front of and behind the lid kinematic device or if interruptive members are present in front of and behind the lid kinematic device.

In view of the foregoing background, it is therefore an object of the present invention to provide an emergency mechanism even if no space is present in front of and behind a lid kinematic device.

Solution to the Problem

To solve the problem, the present invention is configured to disengage a pinion driven by an electric motor from a gear driving a linkage in an axial (thickness) direction of the gear.

Specifically, the present invention is directed to an emergency mechanism for a lid kinematic device, and provides the following solution.

A first aspect of the invention is directed to an emergency mechanism for a lid kinematic device including a linkage opening and closing a lid using an electric motor as a driving source. The emergency mechanism includes an emergency member disconnecting the linkage and the electric motor from each other and applying external force to the lid to make the lid openable and closable. The linkage includes a base bracket having a length extending in a longitudinal direction of a vehicle, and a driving lever having one end pivotally connected to the base bracket and the other end connected to the lid, the driving lever being driven via a pinion by a gear driven by the electric motor, the gear is rotatably attached to the base bracket, the electric motor is fixed to a motor bracket and attached via the motor bracket to the base bracket, the emergency member includes a support member that supports one lateral end of the motor bracket and a fixture that fixes the motor bracket to the base bracket, and loosening the fixture allows the pinion and the gear to be disengaged from each other in an axial direction of the gear.

According to this configuration, the emergency member includes the support member that supports one lateral end of the motor bracket and the fixture that fixes the motor bracket to the base bracket. Loosening the fixture allows the pinion and the gear to be disengaged from each other in the axial direction of the gear. That is why, even if no space is present in front of and behind the lid kinematic device, the gear and the pinion can be disengaged from each other.

A second aspect of the invention is an embodiment of the first aspect of the invention. In the second aspect, the fixture may be a bolt.

This allows the motor bracket to be reliably fixed to the base bracket.

A third aspect of the invention is an embodiment of the second aspect of the invention. In the third aspect, a retaining ring may be provided for the bolt.

This can prevent the bolt from dropping off the base bracket when the bolt is loosened.

A fourth aspect of the invention is an embodiment of any one of the first through third aspects of the invention. In the fourth aspect, the support member may be a rotational hinge, a rotational spring hinge, or a leaf spring hinge that supports the motor bracket so that the motor bracket is turnable around the one lateral end portion of the motor bracket.

According to this configuration, when the fixture is removed, the motor bracket can be reliably separated from the base bracket by the rotational hinge, the rotational spring hinge, or the leaf spring hinge. This allows the gear and the pinion to be reliably disengaged from each other and to be reliably restored.

A fifth aspect of the invention is an embodiment of the fourth aspect of the invention. In the fifth aspect, the leaf spring hinge may be made of a metal or a resin.

Advantages of the Invention

According to the present invention, even if no space is present in front of and behind a lid kinematic device, an emergency mechanism can be provided.

DESCRIPTION OF EMBODIMENTS

One Embodiment

An embodiment of the present invention will now be described with reference to the drawings.

Figure 1:
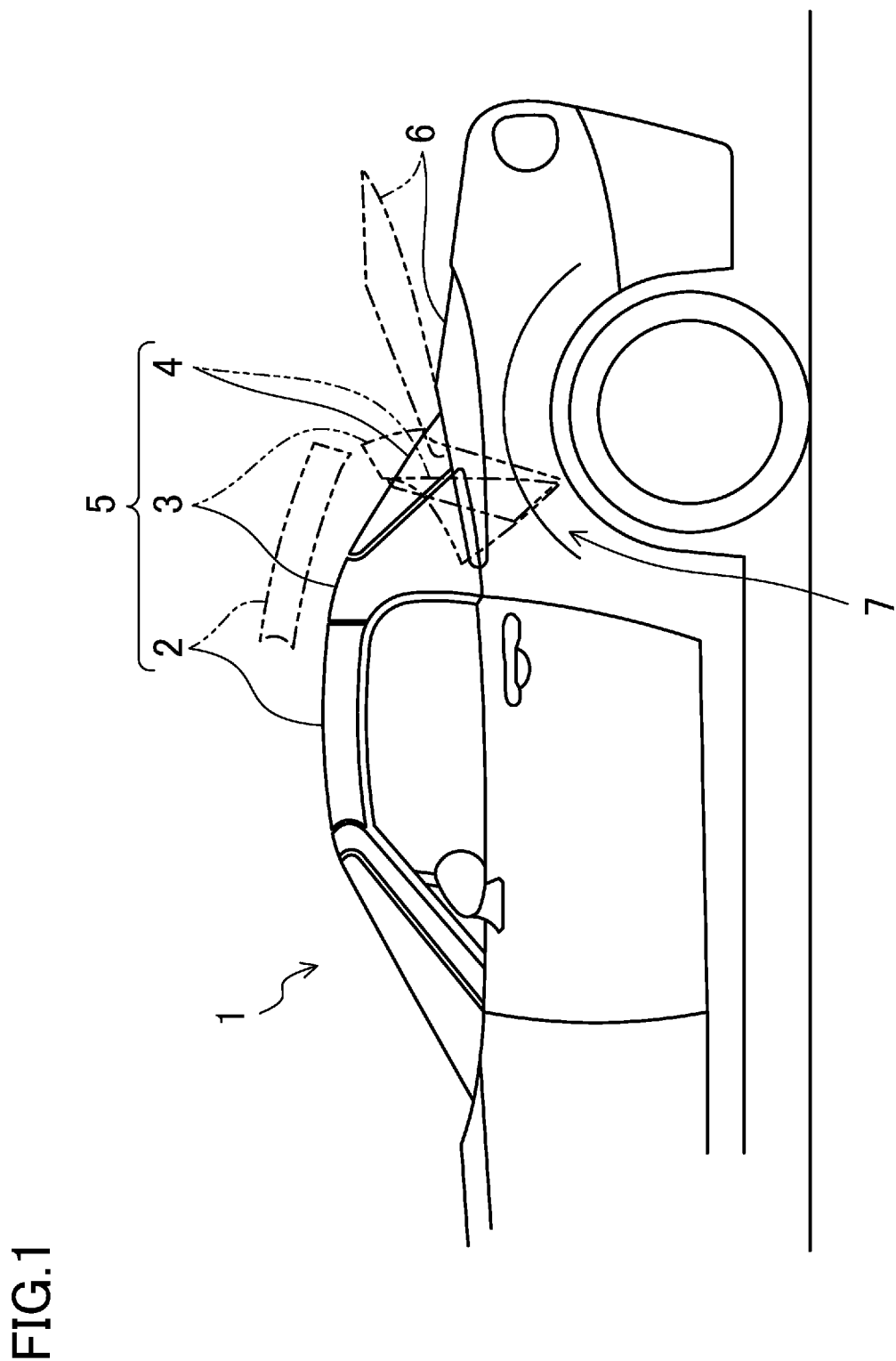
FIG. 1 is a schematic side view showing a rear portion of a vehicle including a retractable roof provided with an emergency mechanism for a lid kinematic device according to one embodiment of the present invention.
Figure 2:
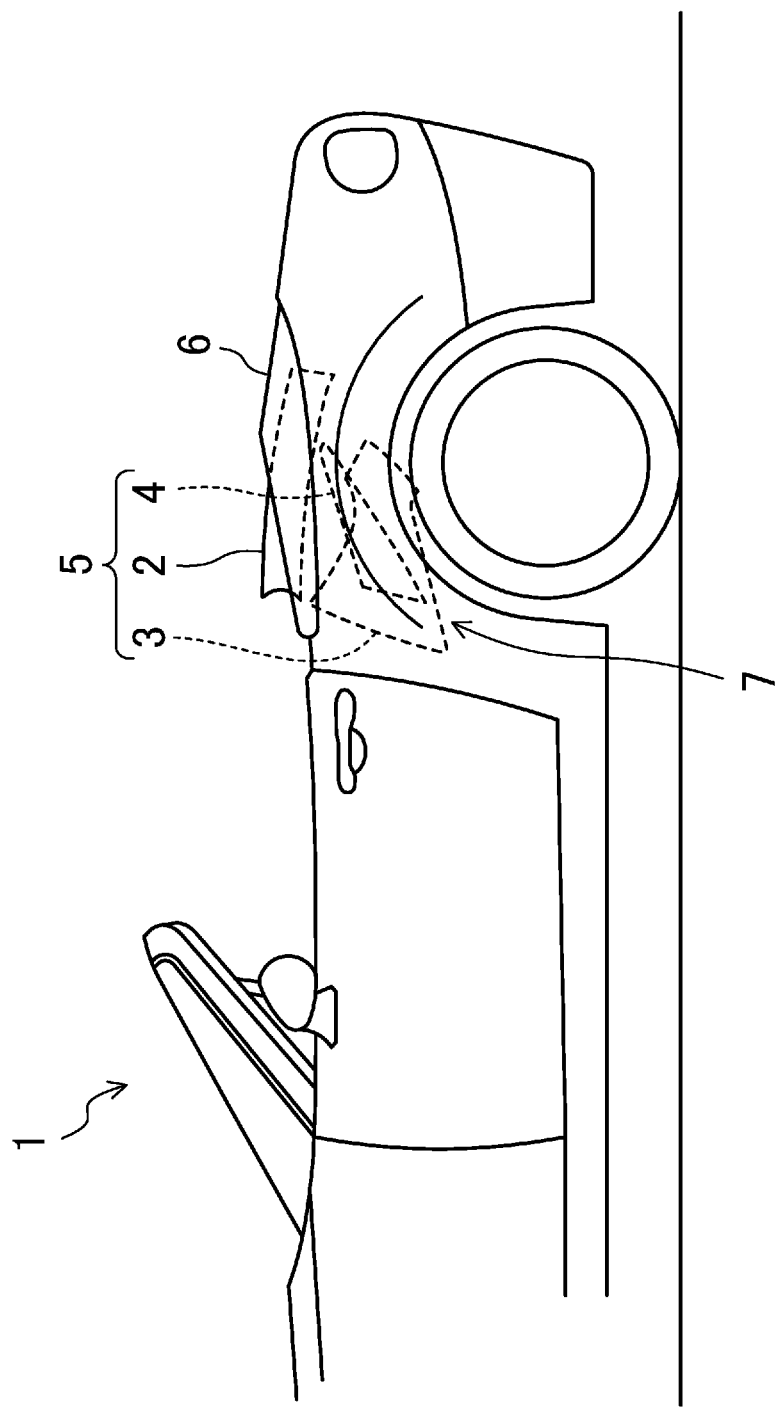
FIG. 2 is another schematic side view showing the rear portion of the vehicle including the retractable roof provided with the emergency mechanism for the lid kinematic device according to the embodiment of the present invention.

FIGS. 1 and 2 schematically show a side surface of a rear portion of a vehicle (a passenger car) 1 including a retractable roof 5.

The retractable roof 5 includes a front roof 2 serving as the ceiling of a passenger compartment, a middle roof 3 on the rear side of the passenger compartment, and a rear window 4. While the retractable roof 5 is in a fully open state shown in FIG. 2, the front roof 2, the middle roof 3, and the rear window 4 are folded and retracted into a storage space 7. In FIG. 1, a state where the retractable roof 5 is fully closed is indicated by solid lines, and a state where the retractable roof 5 is half closed (half open) is indicated by dash-dot lines. When the retractable roof 5 is in the fully open state and in the fully closed state, the storage space 7 is covered with a lid (deck) 6. The retractable roof 5 and the lid 6 are opened and closed by different pairs of linkages. The pair of the linkages for the lid is a lid kinematic device. Note that if each linkage were illustrated, this illustration would be complicated and hard to see. Thus, the linkages are not shown in FIGS. 1 and 2.

Figure 3:
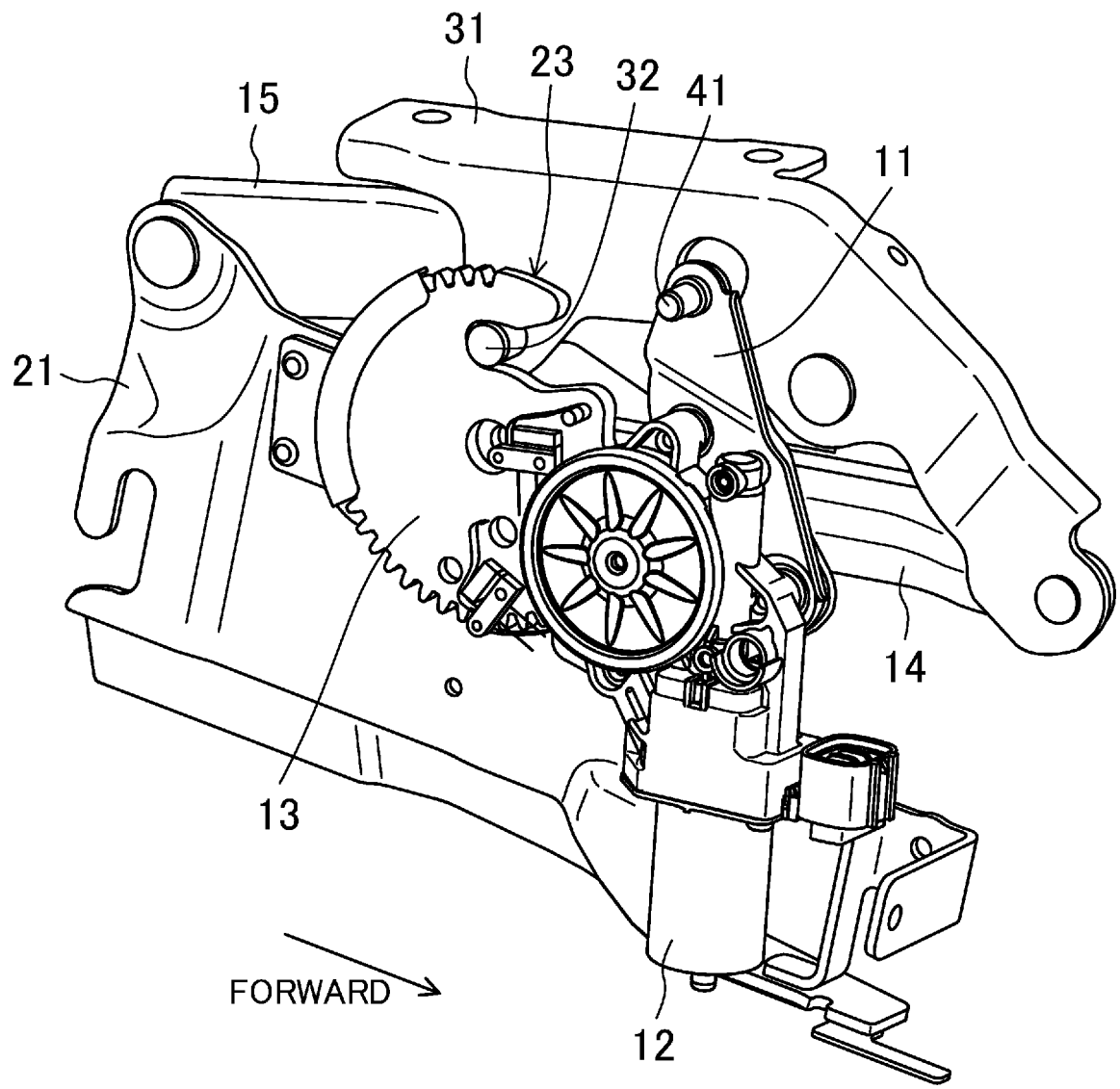
FIG. 3 is a schematic perspective view showing one side portion of the lid kinematic device according to the embodiment of the present invention.
Figure 4:
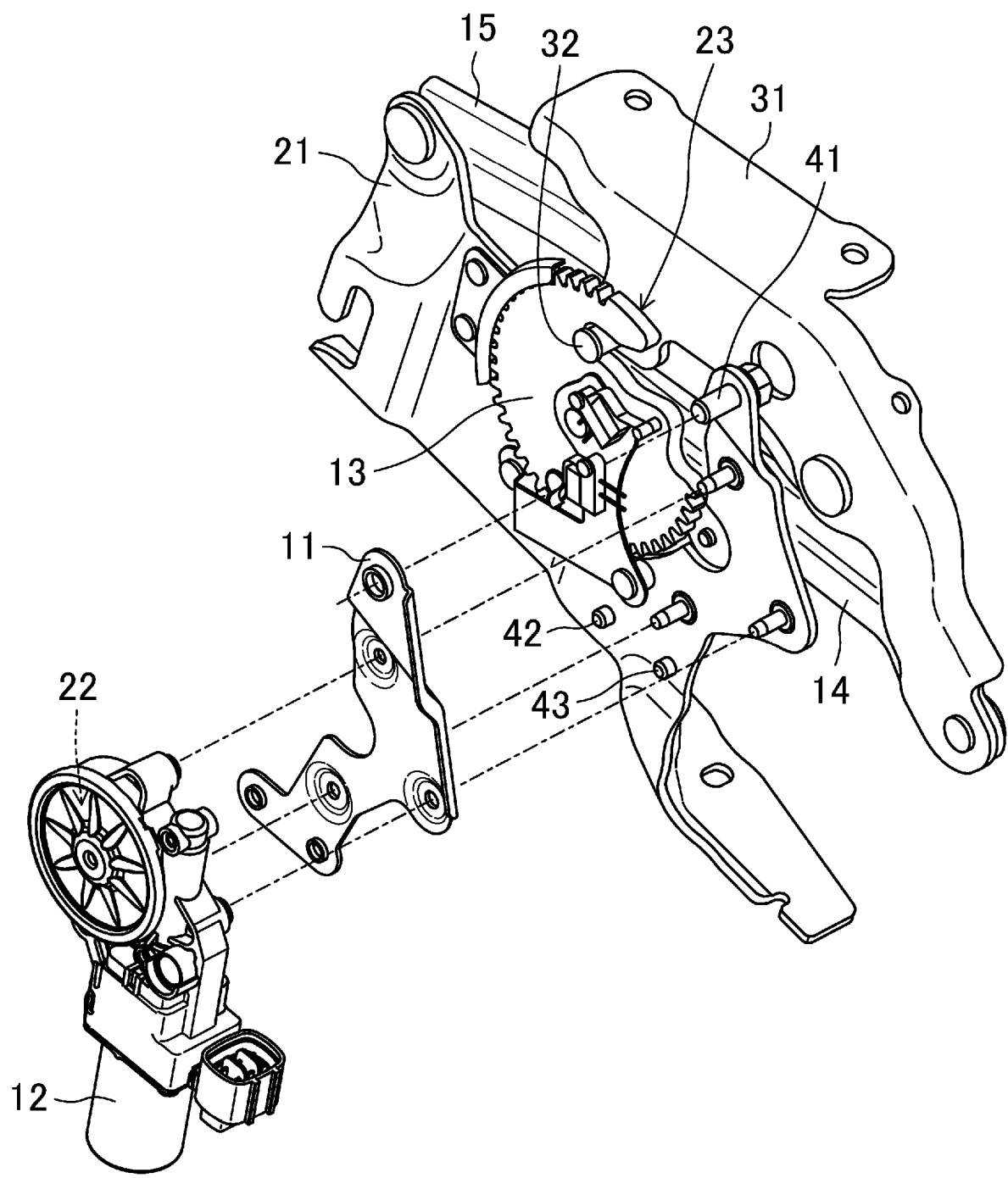
FIG. 4 is a schematic exploded perspective view showing the one side portion of the lid kinematic device according to the embodiment of the present invention.
Figure 5:
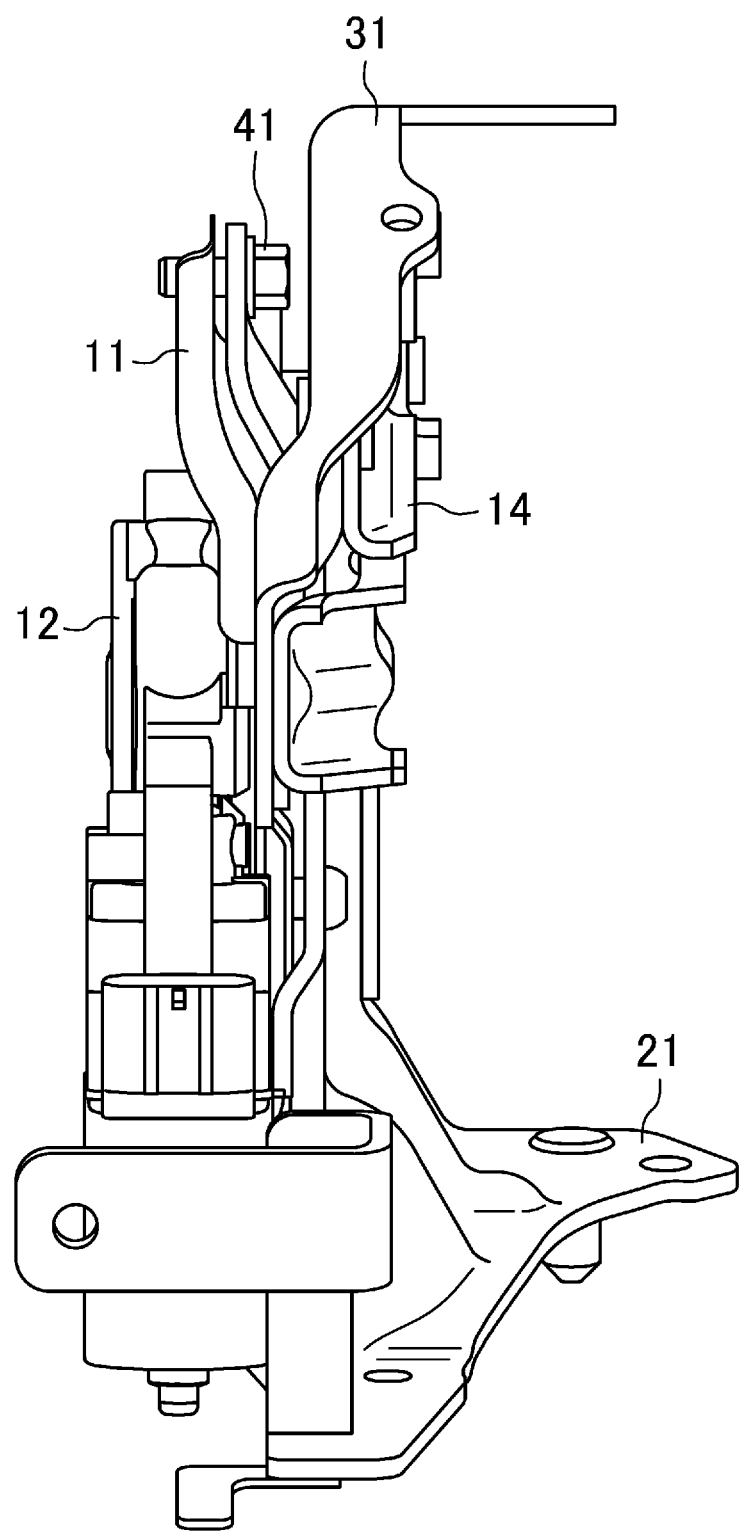
FIG. 5 is a schematic side view showing another side portion of the lid kinematic device according to the embodiment of the present invention.

FIGS. 3 to 5 show one side portion of one of the linkages for opening and closing the lid 6. FIG. 3 shows a state where the lid 6 (not shown) is closed and a pinion (not shown) of an electric motor 12 and a sector gear 13 driving the linkage mesh with each other. FIG. 4 is an exploded perspective view of the linkage from which a motor bracket 11 and the electric motor 12 are detached. FIG. 5 is a side view of the lid linkage as viewed from the front thereof.

As shown in FIGS. 3 to 5, the linkage is a mechanism for opening and closing the lid using the electric motor 12 as a driving source, and includes a base bracket 21, a lid bracket 31 fixed to the lid 6, a driving lever 14, and a driven lever 15. The driving lever 14 has two ends respectively pivotally connected to the base bracket 21 and the lid bracket 31, and actuates the linkage. The driven lever 15 has two ends respectively pivotally connected to the base bracket 21 and the lid bracket 31, and regulates the range in which the lid 6 is openable and closable and the movement of the opening and closing lid 6. The base bracket 21 is fixed to the vehicle body by being fixed to the bottom of the storage space 7.

In the linkage, the driving lever 14 is driven by the sector gear 13. A pin attached to the sector gear 13 fits into a slot (not shown) of a cam attached to the driving lever 14. While the rotation of the sector gear 13 causes the pin to move through the slot, force is applied to the inner wall of the slot to drive the driving lever 14. The sector gear 13 is rotatably attached to the base bracket 21 by a sector gear mounting bolt, and is driven by the electric motor 12 via a pinion 22 (hidden behind the electric motor 12 in FIG. 4). That is to say, the sector gear mounting bolt serves as a rotating shaft of the sector gear 13.

While the lid 6 is closed, a hook portion 23 of the sector gear 13 engages with a hook engaging pin 32 of the lid bracket 31 fixed to the lid 6, which is locked so as not to open. One gear end portion of the sector gear 13 is shaped into a hook shape to form the hook portion 23.

The electric motor 12 is fixed to the motor bracket 11. In this embodiment, the motor bracket 11 has a lower end portion attached to the base bracket 21 by, for example, two bolts 42 and 43, and an upper end portion attached to the base bracket 21 by, for example, one bolt 41. In this embodiment, the bolts 41, 42, and 43 are each screwed into, for example, an associated one of female-threaded holes of the base bracket 21. Here, the lower end portion of the motor bracket 11 and the bolts 42 and 43 correspond to a support member for an emergency member, and the bolt 41 for the upper end portion of the motor bracket 11 corresponds to a fixture for the emergency member.

Here, suppose that the electric motor 12 is broken and inoperable. In that case, if the fully open retractable roof 5 is retracted into the storage space 7, which is covered with the closed lid 6, and it rains while the vehicle is located outdoors, the retractable roof 5 cannot be closed. As a result, the rain enters the passenger compartment. In this case, since the sector gear 13 and the pinion 22 mesh with each other, the sector gear 13 does not move unless the motor shaft rotates. If an attempt is made to forcibly move the sector gear 13 from outside to rotate the inoperable motor shaft, a very large force is required. Thus, the linkage is damaged. Moreover, in this case, it is impossible to manually rotate the motor shaft. Thus, a request needs to be made of a special repair shop to work to rotate the motor shaft.

Figure 6:
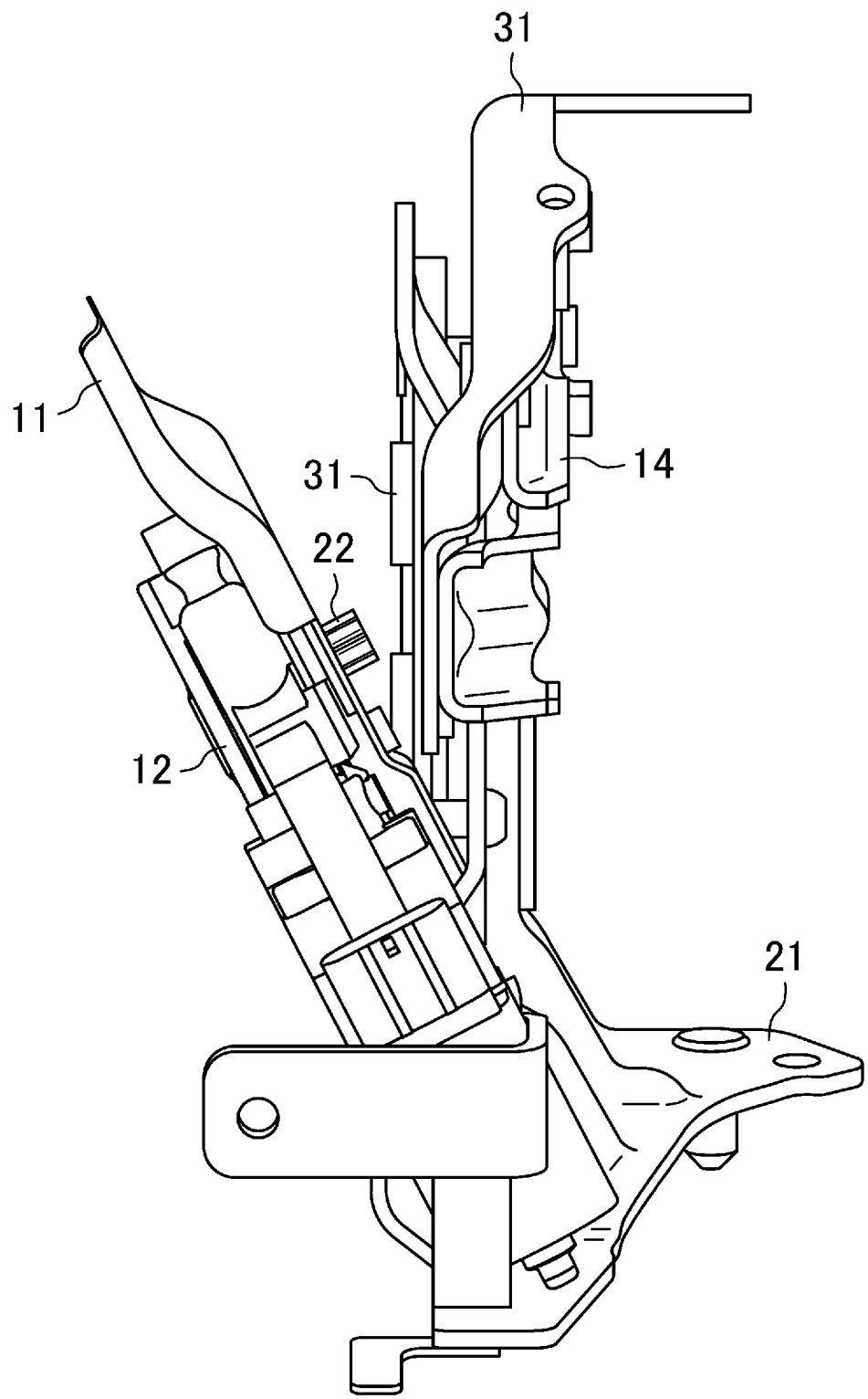
FIG. 6 is a schematic side view showing the another side portion of the lid kinematic device according to the embodiment of the present invention with a gear and a pinion disconnected from each other.

In this embodiment, if, as shown in FIG. 6, out of the bolts 42 and 43 for the lower end portion of the motor bracket 11 forming part of the emergency member and the bolt 41 for the upper end portion of the motor bracket 11, the upper bolt 41 is removed, an upper portion of the motor bracket 11 moves away from the base bracket 21 around the lower end portion of the motor bracket 11. As a result, the pinion 22 and the sector gear 13 are disengaged from each other. If the pinion 22 and the sector gear 13 are disengaged from each other, the sector gear 13 is operated by a rod-like member or any other member to disengage the hook portion 23 from the engagement pin 32. If the hook portion 23 and the engagement pin 32 are disengaged from each other, the lid 6 can be manually lifted (i.e., opened).

—Advantages—

As can be seen from the foregoing description, according to this embodiment, loosening the bolt 41 that fixes the upper end portion of the motor bracket 11 allows the sector gear 13 and the pinion 22 to be disengaged from each other in the axial direction (thickness direction) of the sector gear 13. Specifically, even if no margin (space) is present in front of and behind the lid kinematic device that is the lid linkage, the sector gear 13 retained by the base bracket 21 can be disengaged from the pinion 22 retained by the electric motor 12.

Further, in the known configuration, as described above, the rotating shafts of the pinion 22 and the sector gear 13 move away from each other in a direction perpendicular to the axial direction of the rotation shafts, thereby disconnecting the pinion 22 and the sector gear 13 from each other. Thus, when the pinion 22 and the sector gear 13 are connected together again, backlash values of the pinion 22 and the sector gear 13 differ from their respective original values. This may cause rattling and abnormal noise. On the other hand, in this embodiment, the pinion 22 and the sector gear 13 are moved away from each other in the axial direction (thickness direction) of the sector gear 13 so as to be disconnected from each other. Thus, when the pinion 22 and the sector gear 13 are connected together again, backlash values of the pinion 22 and the sector gear 13 are substantially unchanged. This makes it difficult to cause the problem described above.

In this embodiment, the bolt 41, which is a fixture forming part of the emergency member, is disposed on the upper end portion of the motor bracket 11, and the support member forming part of the emergency member corresponds to the lower end portion of the motor bracket 11. However, this configuration is merely an example of the present invention. Specifically, as long as a margin (space) large enough for a hand to be inserted therein is present in the lateral direction of the lid kinematic device, the fixture may be located below the support member, or the fixture and the support member may be arranged substantially laterally (horizontally).

One Variation of Embodiment

A variation according to the embodiment of the present invention will now be described with reference to the drawings.

Figure 7:
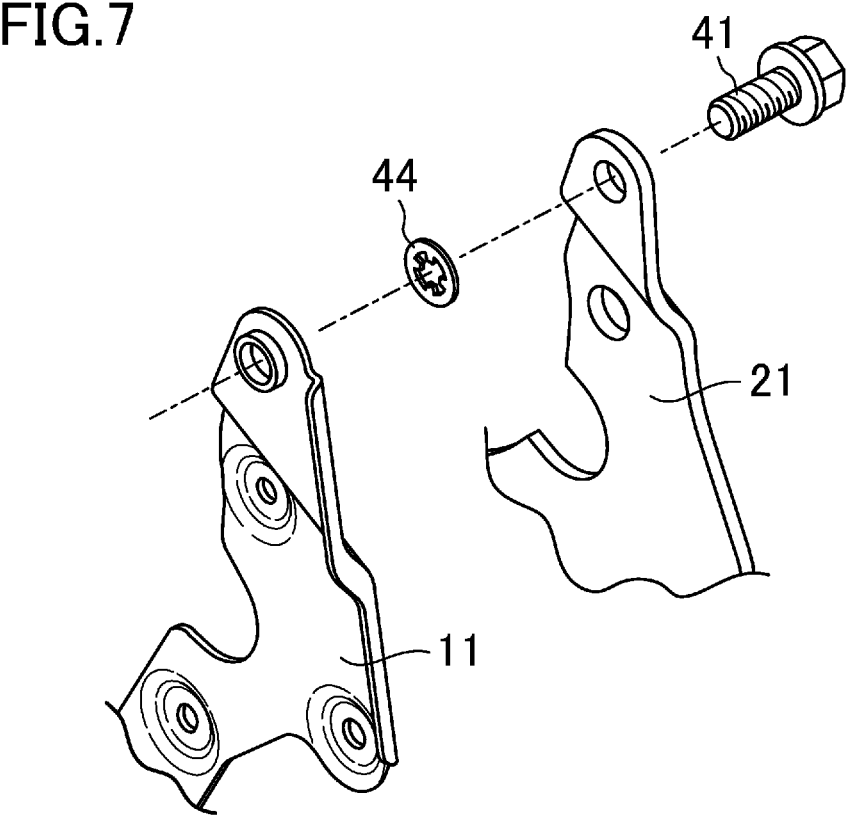
FIG. 7 is an exploded perspective view showing a variation of a threaded portion of a bolt that is a fixture forming part of an emergency member for the lid kinematic device according to the embodiment of the present invention.
Figure 8:
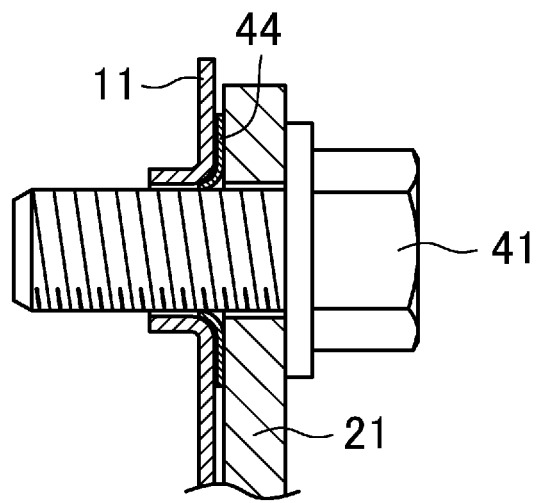
FIG. 8 is a partial cross-sectional view showing the threaded portion of the bolt shown in FIG. 7.

FIGS. 7 and 8 show a variation of the threaded portion of the bolt 41 that is the fixture forming part of the emergency member. FIG. 7 is an exploded perspective view of the variation, and FIG. 8 is a cross-sectional view thereof.

As shown in FIGS. 7 and 8, the threaded portion of the bolt 41 is inserted into, and run through a bolt hole of the base bracket 21, and a push nut (retaining ring) 44 is fitted to the threaded portion of the bolt 41. That is to say, the bolt 41 is fastened with the push nut 44 interposed between the base bracket 21 and the motor bracket 11. This allows the upper portion of the motor bracket 11 to be separated from the base bracket 21 without dropping the bolt 41 even if the bolt 41 is loosened. Thus, this variation eliminates the need for preparing a new bolt 41.

Another Variation of Embodiment

Another variation according to the embodiment of the present invention will now be described with reference to the drawings.

Figure 9:
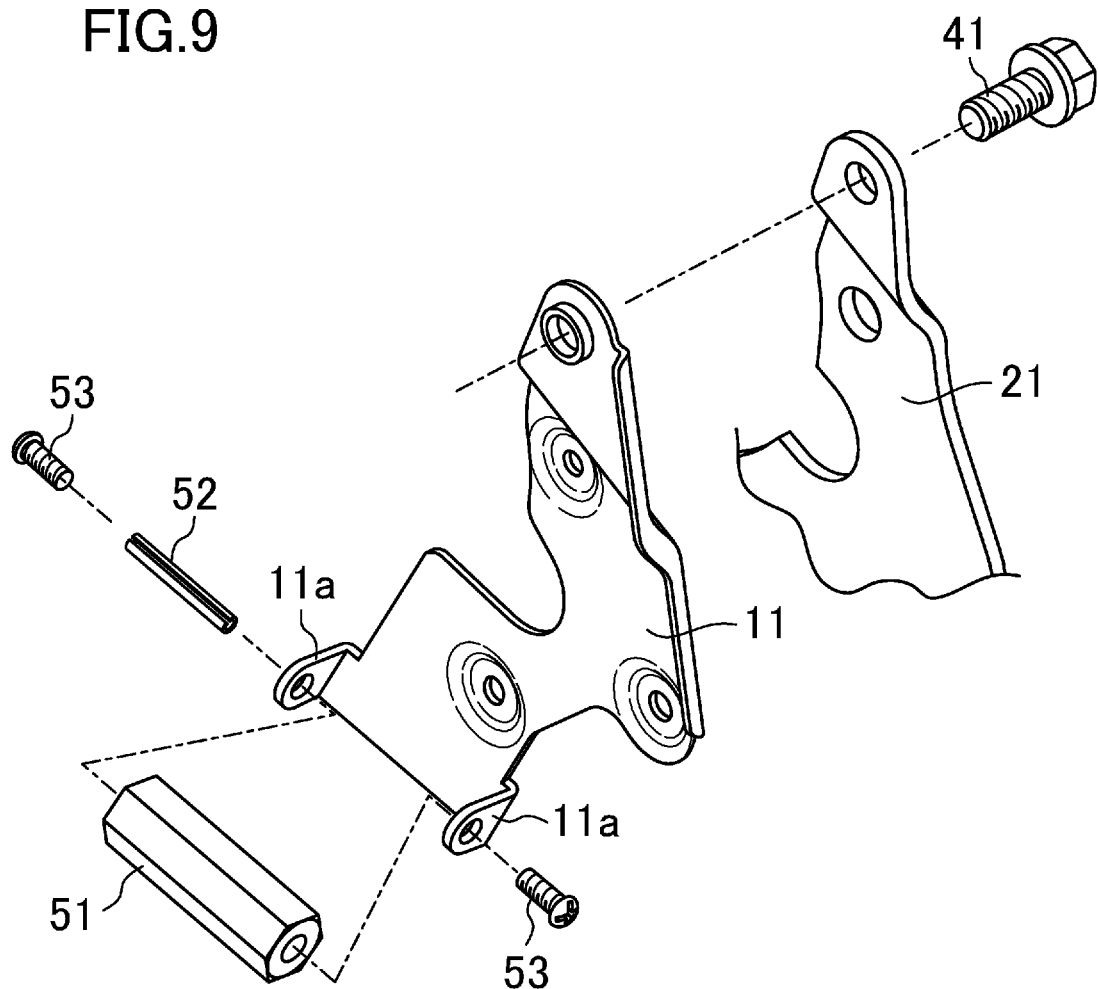
FIG. 9 is an exploded perspective view showing a first variation of a support member forming part of the emergency member for the lid kinematic device according to the embodiment of the present invention.
Figure 10:
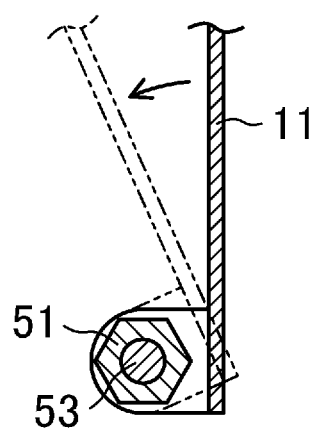
FIG. 10 is a partial side view showing the support member shown in FIG. 9.

FIGS. 9 and 10 show a first variation of the support member forming part of the emergency member. FIG. 9 is an exploded perspective view of the first variation, and FIG. 10 is a schematic side view for explaining operation of the first variation.

The support member according to the first variation is provided on the lower end portion of the motor bracket 11, and includes a pair of bent-out portions 11*a*, a tubular (hexagonal tubular in the drawings) block 51, a spring pin 52, and screws 53. The bent-out portions each have a screw hole. These screw holes face each other. The block 51 has a portion welded (fused) to a predetermined portion of the base bracket 21, and fits between the pair of the bent-out portions 11*a*. The spring pin 52 engages the bent-out portions 11*a* of the motor bracket 11 with the block 51, and functions as a spring in the direction of rotation of the axis. The screws 53 fasten both end portions of the spring pin 52 to the bent-out portions 11*a*, respectively. That is to say, the support member according to this variation has a rotational spring hinge structure.

According to the configuration of the first variation of the support member, as shown in FIG. 10, loosening or disengaging the bolt 41 through the upper end portion of the motor bracket 11 allows the upper end portion to rotate toward the electric motor 12 around the spring pin 52. As a result, the sector gear 13 of the base bracket 21 and the pinion 22 of the motor bracket 11 are disconnected (disengaged) from each other. At this time, depending on restoring force (elastic force) of the spring pin 52, the motor bracket 11 does not rotate by an angle as large as 180°, but stops at a position where the restoring force of the spring pin 52 is balanced with gravity.

Note that the spring pin 52 does not always have to be used, and the motor bracket 11 may be supported only by the two screws 53. In this case, the support member has a rotational hinge structure.

Still Another Variation of Embodiment

Still another variation according to the embodiment of the present invention will now be described with reference to the drawings.

Figure 11:
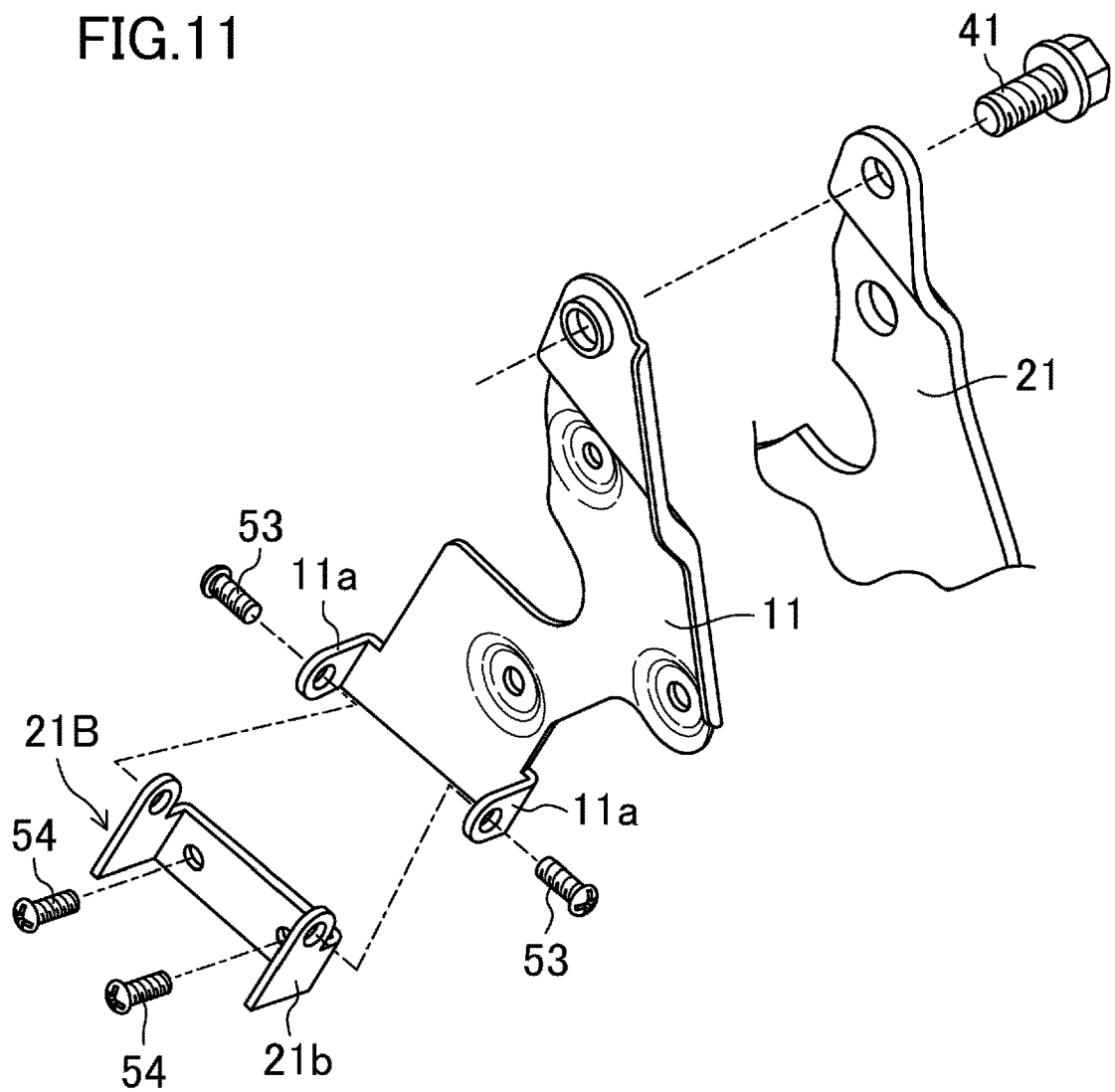
FIG. 11 is an exploded perspective view showing a second variation of the support member forming part of the emergency member for the lid kinematic device according to the embodiment of the present invention.
Figure 12:
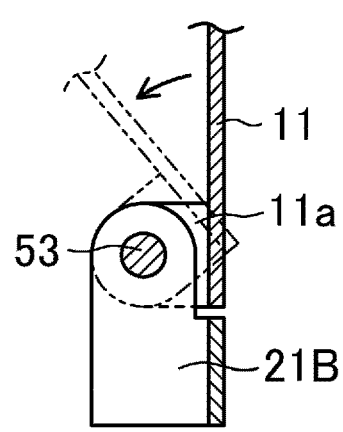
FIG. 12 is a partial side view showing the support member shown in FIG. 11.

FIGS. 11 and 12 show a second variation of the support member forming part of the emergency member. FIG. 11 is an exploded perspective view of the second variation, and FIG. 12 is a schematic side view for explaining operation of the second variation.

The support member according to the second variation is provided on the lower end portion of the motor bracket 11, and includes a pair of bent-out portions 11*a*, a supporting part 21B, and screws 53. The bent-out portions 11*a* each have a screw hole. These screw holes face each other. The supporting part 21B has two ends respectively provided with a pair of bent-out portions 21*b*, and has a portion retaining the bent-out portions 21*b* and fastened to a predetermined portion of the base bracket 21 through two screws 54. The supporting part 21B fits between the pair of the bent-out portions 11*a* of the motor bracket 11. The screws 53 support the bent-out portions 11a of the motor bracket 11 so that the bent-out portions 11a is turnable around the bent-out portions 21b of the supporting part 21B. That is to say, the support member according to this variation has a rotational hinge structure.

According to the configuration of the second variation of the support member, as shown in FIG. 12, loosening or disengaging the bolt 41 through the upper end portion of the motor bracket 11 allows the upper end portion to rotate toward the electric motor 12 around the screws 53. As a result, the sector gear 13 of the base bracket 21 and the pinion 22 of the motor bracket 11 are disconnected (disengaged) from each other.

Note that the spring pin 52 of the first variation described above may be disposed between the bent-out portions 21b of the supporting part 21. In this case, the support member has a rotational spring hinge structure.

Yet Another Variation of Embodiment

Yet another variation according to the embodiment of the present invention will now be described with reference to the drawings.

Figure 13:
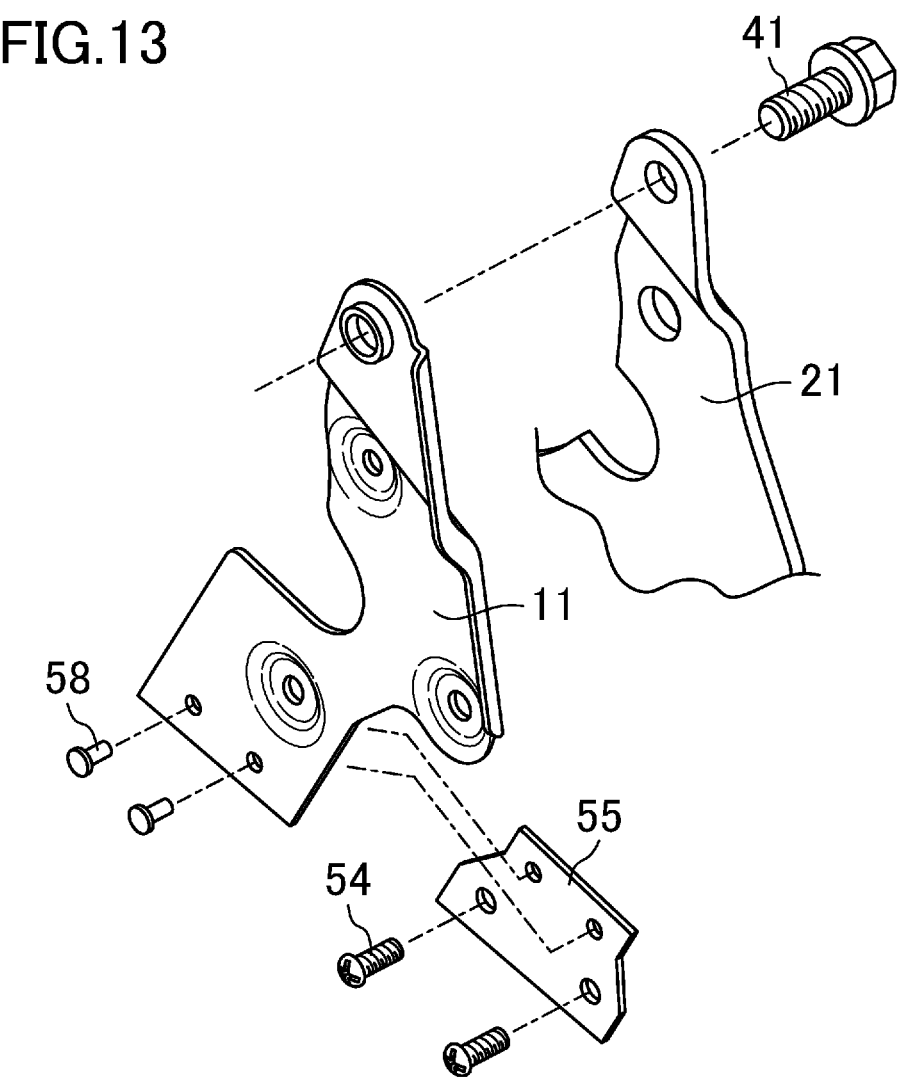
FIG. 13 is an exploded perspective view showing a third variation of the support member forming part of the emergency member for the lid kinematic device according to the embodiment of the present invention.
Figure 14:
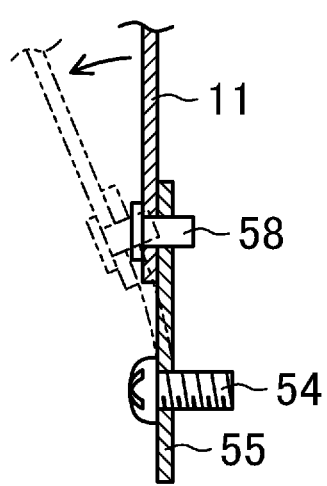
FIG. 14 is a partial side view showing the support member shown in FIG. 13.

FIGS. 13 and 14 show a third variation of the support member forming part of the emergency member. FIG. 13 is an exploded perspective view of the third variation, and FIG. 14 is a schematic side view for explaining operation of the third variation.

The support member according to the third variation has a lower end portion fastened to a predetermined portion of the base bracket 21 by two screws 54, and an upper end portion fixed to the lower end portion of the motor bracket 11 by two rivets 58 and configured as a flexible leaf spring-like supporting part 55. That is to say, the support member according to this variation has a leaf spring hinge structure.

According to the configuration of the third variation of the support member, as shown in FIG. 14, loosening or disengaging the bolt 41 through the upper end portion of the motor bracket 11 allows the upper end portion to rotate toward the electric motor 12 around the screws 54. As a result, the sector gear of the base bracket 21 and the pinion of the motor bracket 11 are disconnected (disengaged) from each other.

A metal spring made of ordinary steel, for example, may be used as the flexible leaf spring-like supporting part 55 forming part of the support member. Alternatively, a resin material may be used as the flexible leaf spring-like supporting part 55.

INDUSTRIAL APPLICABILITY

An emergency mechanism for a lid kinematic device according to the present invention includes a pinion and a gear that can be easily disengaged from each other in the lateral (side) direction of a vehicle. Thus, the emergency mechanism is useful as an emergency mechanism for a lid opening/closing mechanism of a vehicle having no margin in the longitudinal direction of the vehicle.

DESCRIPTION OF REFERENCE CHARACTERS

6 Lid (Deck)
11 Motor Bracket
11a Bent-out Portion (Emergency Member: Support Member)
12 Electric Motor
13 Sector Gear (Gear)
14 Driving Lever
15 Driven Lever
21 Base Bracket
21B Supporting Part (Emergency Member: Support Member)
21b Bent-out Portion (Emergency Member: Support Member)
22 Pinion
31 Lid Bracket
41 Bolt (Emergency Member: Fixture)
44 Push Nut (Retaining Ring)
51 Block (Emergency Member: Support Member)
52 Spring Pin (Emergency Member: Support Member)
53 Screw (Emergency Member: Support Member)
55 Supporting Part (Emergency Member: Support Member)

The invention claimed is:

1. An emergency mechanism for a lid kinematic device including a linkage opening and closing a lid using an electric motor as a driving source, the emergency mechanism comprising an emergency member disconnecting the linkage and the electric motor from each other and applying external force to the lid to make the lid openable and closable, wherein:
    the linkage includes a base bracket having a length extending in a longitudinal direction of a vehicle, and a driving lever having one end pivotally connected to the base bracket and the other end connected to the lid, the driving lever being driven via a pinion by a gear driven by the electric motor,
    the gear is rotatably attached to the base bracket,
    the electric motor is fixed to a motor bracket and attached via the motor bracket to the base bracket, and
    the emergency member includes a support member that supports one lateral end of the motor bracket and a fixture that fixes the motor bracket to the base bracket, and loosening the fixture allows the pinion and the gear to be disengaged from each other in an axial direction of the gear, wherein:
    the support member is provided on a lower end portion of the motor bracket,
    the fixture is provided on an upper end portion of the motor bracket, and
    the motor bracket is configured so that loosening the fixture allows the upper end portion of the motor bracket to rotate about an axis of the support member in the axial direction of the gear and downward.
2. The emergency mechanism of claim 1, wherein:
    the fixture is a bolt.
3. The emergency mechanism of claim 2, wherein:
    a retaining ring is provided for the bolt.
4. The emergency mechanism of claim 1, wherein:
    the support member is a rotational hinge, a rotational spring hinge, or a leaf spring hinge that supports the motor bracket so that the motor bracket is turnable around the one lateral end portion of the motor bracket.
5. The emergency mechanism of claim 4, wherein:
    the leaf spring hinge is made of a metal or a resin.

* * * * *